(12) United States Patent
Cooper et al.

(10) Patent No.: US 7,045,474 B2
(45) Date of Patent: May 16, 2006

(54) REINFORCED CEMENTITIOUS BOARDS AND METHODS OF MAKING SAME

(75) Inventors: Ian Cooper, St. Catherines (CA); John F. Porter, St. Catherines (CA); Jeremy-Jon Hardy, St. Catherines (CA)

(73) Assignee: CertainTeed Corporation, Valley Forge, PA (US)

( * ) Notice: Subject to any disclaimer, the term of this patent is extended or adjusted under 35 U.S.C. 154(b) by 208 days.

(21) Appl. No.: 09/844,058

(22) Filed: Apr. 27, 2001

(65) Prior Publication Data

US 2002/0019181 A1 Feb. 14, 2002

Related U.S. Application Data

(62) Division of application No. 09/206,636, filed on Dec. 7, 1998, now Pat. No. 6,254,817.

(51) Int. Cl.
*B32B 27/12* (2006.01)
*B32B 27/04* (2006.01)

(52) U.S. Cl. .............................. 442/43; 442/20; 442/42; 442/54; 442/58; 442/180

(58) Field of Classification Search ................. 442/20, 442/42, 43, 54, 58, 190; 428/489; 52/337, 52/388, 448, 449, 454
See application file for complete search history.

(56) References Cited

U.S. PATENT DOCUMENTS 4,229,497 A  10/1980  Piazza
4,345,037 A   8/1982  Fyles et al.
4,504,335 A   3/1985  Galer
4,537,610 A   8/1985  Armstrong et al.

(Continued)

FOREIGN PATENT DOCUMENTS

EP    0 637 658 B1   12/1987
EP    0 637 658 B1   12/1997
GB    2023687 A       1/1980

OTHER PUBLICATIONS

Plastics Engineering Handbook, 4$^{th}$ ed., Joel Frados, Ed., p. 29, 1987.
Fehrer AG technical brochure No. 576196/E–08/95 (Linz, Austria.
Fehrer AG technical brochure No. 577596/E–09/E–09/95 (Linz, Austria).
Search Report from International Application PCT/US99/28931.

*Primary Examiner*—Ula Ruddock
(74) *Attorney, Agent, or Firm*—Duane Morris LLP

(57) ABSTRACT

A composite fabric for use in reinforcement, particularly tensile reinforcement, of cementitious boards and similar prefabricated building wall panels. The fabric is constructed as a mesh of continuously coated, high modulus of elasticity strands. The high modulus strands are preferably bundled glass fibers encapsulated by alkali and water resistant thermoplastic material. The composite fabric also has suitable physical characteristics for embedment within the cement matrix of the panels or boards closely adjacent the opposed faces thereof. The fabric provides long-lasting, high strength tensile reinforcement of the panels or boards regardless of their spatial orientation during handling. The reinforcement also enhances the impact resistance of the boards after installation. Included as part of the invention are methods for making the reinforcement, cementitious boards and panels including the reinforcement, and methods for manufacturing such boards and panels.

22 Claims, 1 Drawing Sheet

U.S. PATENT DOCUMENTS

| | | | |
|---|---|---|---|
| 4,617,219 A | | 10/1986 | Schupack |
| 4,699,542 A | | 10/1987 | Shoesmith |
| 4,762,750 A | * | 8/1988 | Girgis et al. ................. 428/378 |
| 4,957,390 A | | 9/1990 | Shoesmith et al. |
| 4,967,548 A | * | 11/1990 | Fangeat et al. ............. 428/364 |
| 5,011,523 A | | 4/1991 | Roncato et al. |
| 5,110,627 A | | 5/1992 | Shoesmsith et al. |
| 5,221,386 A | | 6/1993 | Ensiminger et al. |
| 5,246,306 A | | 9/1993 | Shoesmith et al. |
| 5,316,561 A | | 5/1994 | Roncato et al. |
| 5,328,493 A | | 7/1994 | Roncato et al. |
| 5,350,554 A | | 9/1994 | Miller |
| 5,393,559 A | | 2/1995 | Shoesmith et al. |
| 5,425,796 A | | 6/1995 | Loubinoux et al. |
| 5,451,355 A | * | 9/1995 | Boissonnat et al. ......... 118/405 |
| 5,454,846 A | | 10/1995 | Roncato et al. |
| 5,552,207 A | | 9/1996 | Porter et al. |
| 5,763,043 A | * | 6/1998 | Porter et al. ................ 428/109 |
| 6,054,205 A | * | 4/2000 | Newman et al. ............ 156/181 |
| 6,171,984 B1 | * | 1/2001 | Paulson et al. ............. 405/107 |
| 6,183,835 B1 | * | 2/2001 | Cho et al. .................... 156/290 |
| 6,335,087 B1 | * | 1/2002 | Hourahane ............... 428/293.4 |

* cited by examiner

REINFORCED CEMENTITIOUS BOARDS AND METHODS OF MAKING SAME

This is a divisional of U.S. Ser. No. 09/206,636 filed Dec. 7, 1998, now U.S. Pat. No. 6,254,817.

FIELD OF THE INVENTION

The present invention relates in general to reinforced products and in particular to reinforced cementitious boards for building construction and methods of making such boards.

BACKGROUND OF THE INVENTION

Dry wall or gypsum board is commonly used in the erection of interior walls in commercial, residential and other building structures. Dry wall is effective when used to enclose rooms subject to normal humidity and surface moisture conditions that occur in many of the rooms commonly found in offices, shops, residences and other buildings. However, bathrooms, basements and certain areas of residential and commercial kitchens may pose potential moisture problems for interior walls constructed from dry wall wallboard.

When dry wall is used in bathrooms, for example, tile may be adhered directly to the dry wall. Alternatively, some bathrooms utilize prefabricated modular stalls and/or bathtubs which may be adhered to the dry wall in the bathing areas of the room. Because hot baths and, especially, hot showers produce steam, bathrooms are frequently exposed to periods of very high humidity. Additionally, the basins and bathing areas thereof are susceptible to localized collection of surface moisture in the form of small pools or puddles of water. If cracks are present in the tile grout or if the seams between the dry wall and the basins or prefabricated bathing area components are not completely sealed, the steam or puddled surface water may come into contact with the dry wall.

The opposed faces of dry wall are typically covered with paper which is suitable for receiving paints, primers and tile adhesives. However, such paper also has a tendency to absorb water. As the water is absorbed by the paper, it comes into contact with the gypsum core of the dry wall. Gypsum is a hygroscopic material. The gypsum core therefore absorbs moisture that passes through the facing paper. Over the course of time the level of water absorption may degrade the structural integrity of the dry wall board. If the water damage becomes excessive, some or all of the board may require replacement, which may be an especially laborious task in the bathing areas of a bathroom.

Because they are effectively immune to water damage, cementitious boards have been employed as alternatives to dry wall in particularly humid and wet rooms. Cementitious boards may be fabricated to assume essentially the same dimensions and weight, as well as support the same sorts of facing materials, as conventional dry wall. As is known, concrete and similar cementitious materials have far greater compressive strength than tensile strength. This phenomenon mandates that cementitious boards and similar, relatively thin, panel-like cementitious objects be handled with care during transport. More specifically, unless sufficiently reinforced such boards must be carried substantially vertically, i.e., with their opposed faces extending substantially perpendicularly to the ground or floor surface. If carried substantially horizontally, i.e., with the supposed board faces extending substantially parallel to the ground surface such as would occur if opposite end edges or opposite side edges of the board are supported by two or more workers, the material in the upper regions of the board (in the thickness dimensions of the board) would be in compression and the material in the lower regions of the board would be in tension. If the tensile forces exceed the tensile strength of the cementitious material, the board may snap during transport. Alternatively, although less overtly catastrophic, radiant cracking may occur in the lower regions of the board which may preclude its installation or, if installed, might greatly comprise its bearing capacity and service life. Moreover, reinforcement should be of sufficient durability that it continues to strengthen and toughen the board over the typical projected 20–40 year service life of the board.

Various means have been proposed for reinforcing cementitious boards. Typically, the reinforcement comprises an open grid structure whose central plane is embedded approximately 1/32 to 1/16 inch beneath each face of the ordinarily 1/2 to 5/8 inch thick board. For example, open mesh woven polypropylene has been used for this purpose because of its resistance to water and the alkaline chemistries of Portland cement concrete and similar cementitious materials. However, because of the comparatively low modulus of elasticity of polyolefins such as polypropylene and polyethylene, which is on the order of about 10,000 to about 75,000 psi, such materials experience high strain under the tensile loads which can occur due to improper handling of the cementitious board. As tensile reinforcement, therefore, polypropylene grids are of limited practical use.

High modulus of elasticity materials have been proposed as reinforcement for an assortment of products and structures. U.S. Pat. Nos. 4,537,610; 5,011,523; 5,316,561; 5,328,493; 5,425,796; 5,451,355 and 5,454,846, for example, describe various means by which glass fiber rovings or yarns are coated with thermoplastic organic materials to produce composite strands or yarns which can be incorporated into end products. Among these patents, U.S. Pat. No. 5,011,523 proposes the possibility of using such composite rovings or yarns to make fabrics. The fabrics are indicated as being transformable into rigid plates following heat treatment and subsequent cooling of the fabrics. There is no discussion in these documents, however, of whether and how such composite strands or the products made therefrom might be used to reinforce building panels such as cementitious boards.

U.S. Pat. Nos. 4,699,542; 4,957,390; 5,110,627; 5,246,306 and 5,393,559 disclose semi-rigid open mesh grid fabrics comprised of fiberglass warp and weft rovings impregnated with resinous materials. The fabrics are stated as being designed for use in reinforcing asphaltic concrete over layers in roadway constructions. The fiberglass rovings are disclosed as having weights of from about 300 to about 5,000 tex, although ECR or E glass rovings of 2,200 tex are disclosed as the preferred material in each of these patents. Indeed, the commercial embodiment of the products disclosed in these patents, which is produced under the trademark GLASGRID® by Bay Mills Limited of St. Catherines, Ontario, Canada, employs glass rovings of 2000 tex. Rovings of this considerable weight, when impregnated with protective resin, produce a fabric whose strand thickness is approximately 0.04 inch. At the intersection of the warp and weft strands, the fabric thickness rises to approximately 0.056 inch. Fabrics of such substantial thickness may be used without concern in environments such as roadway reinforcement wherein the fabric is to be embedded beneath or between roadway layers of greater than one inch or, more typically, at least about two inches or more in thickness. Indeed, in such installations, fabrics of considerable thickness and grid opening size are desirable. They permit substantial contact between the underlying and overlaid roadway layers which is necessary for effective transfer of potentially damaging stresses from the pavement to the high modulus glass fibers in the fabric.

As noted hereinabove, the reinforcement provided in existing cementitious boards is typically embedded approximately 1/32 to 1/16 inch beneath each face of the boards. By locating the reinforcement so close to the surface of the board faces, the tensile stress transfer from the concrete to the reinforcement is optimized. It is the concrete material which is closest the board faces, i.e., the "skin" concrete, that is potentially subject to the greatest tensile forces and, therefore, in greatest need of tensile stress relief due to improper handling of the board. If reinforcement is embedded much more deeply than about 1/16 inch beneath the board faces, the reinforcement becomes situated too close to the neutral axis of the board. Hence, the flexural modulus of the board is thus reduced, and the board becomes more flimsy and prone to surface cracking. By maintaining the reinforcement close to the board faces, the board is stiffened in much the same way that the parallel flanges strengthen an I-beam.

The rather thick GLASGRID® fabrics thus cannot be used for reinforcement of relatively thin, prefabricated cementitious boards designed for use as interior building wall panels. Firstly, their comparatively thick strands or rovings present a pronounced undulating substrate with which the thin outer "skin" concrete layer of the board must interengage and adhere. The peaks and valleys produced by the thick GLASGRID® fabrics, especially at the warp and weft strand intersections, would produce localized areas where the skin concrete would be less than about 1/16 inch in thickness, which is believed to be the minimum thickness to prevent spalling of the skin concrete. Stated differently, the GLASGRID® fabrics would create a low shear plane between the skin and core concrete of the cementitious boards. The low shear plane, in turn, would hinder retention of the skin concrete (and any facing materials borne thereby such as tile or the like) to the core concrete.

Secondly, if embedded more deeply within the board, the ability of the GLASGRID® fabrics to provide effective tensile stress relief in the skin concrete, would be compromised if not negated.

Bay Mills Limited also produces an open grid fiberglass yarns or fabric coated with polyvinyl chloride (PVC) for use as cementitious board reinforcement. This grid uses fiberglass rovings which are of a size and weight suitable for embedment at an appropriate depth between the outer skin concrete and core concrete of cementitious boards. Portland cement concrete and similar concretes are grainy, alkaline compositions which can damage unprotected glass fibers. PVC is highly alkali and water resistant and, therefore, seemingly suitable for embedment in Portland cement and similar concrete matrix material to protect the fiberglass rovings of the fabric from alkali and water damage, as well as etching from the aggregate particles in the concrete matrix. Because it is a rigid material, PVC requires plasticizers such as ester oils to be rendered sufficiently fluid to be applied and function as a coating. It has been observed, however, that ester oils and related plasticizers are themselves susceptible to alkali attack. The concrete matrix material thus tends to gradually degrade the ester oil modified PVC coating causing small openings to be formed in the coating. Alkali then enters these openings and causes degradation of the glass fiber rovings. The process may proceed to an extent where deterioration of the rovings prevents installation of a cementitious board or, if already installed, replacement of the board.

U.S. Pat. No. 5,552,207 describes wall facing comprising an open grid, resin impregnated, fiberglass fabric which is affixed to a rigid foam insulation board and covered by and embedded within stucco or stucco-like material. The wall facing may be prepared either in situ on the outside of a building or in the form of prefabricated panels which may be bonded to a building wall. The wall facing, including the prefabricated panel embodiments thereof, is attached to a pre-existing wall and is not itself used as a wall panel in the manner, for example, of dry wall or the cementitious boards of the present invention. Indeed, the wall facing may be affixed to dry wall or cementitious boards but cannot be used in lieu thereof because of the low bending strength of its plastic foam backing board. A wall constructed solely of such facing would likely be destroyed as a result of minor impacts thereagainst, including the sorts of impacts routinely absorbed by dry wall and cementitious wall panel boards.

A need exists, therefore, for high modulus reinforcement for cementitious boards and similar construction panels which is of suitable weight and thickness to be embedded near the outer faces of such panels and which is highly resistant to alkali and water attack.

Further advantages exist for reliable methods for manufacturing such reinforcement, boards incorporating the reinforcement and methods for manufacturing such boards.

SUMMARY OF THE INVENTION

The present invention provides a composite fabric for use in reinforcement, particularly tensile reinforcement, of cementitious boards and similar prefabricated building wall panels. The fabric comprises a mesh of continuously coated, high modulus of elasticity strands. The high modulus strands preferably comprise bundled "E" glass fibers encapsulated by alkali and water resistant thermoplastic material. The composite fabric also has suitable physical characteristics for embedment within the cement matrix of the panels or boards closely adjacent the opposed faces thereof. The fabric provides long-lasting, high strength tensile reinforcement of the panels or boards regardless of their spatial orientation during handling. The reinforcement also enhances the impact resistance of the boards after installation.

Included as part of the invention are methods for making the reinforcement, cementitious boards and panels including the reinforcement, and methods for manufacturing such boards and panels.

Other details, objects and advantages of the present invention will become apparent as the following description of the presently preferred embodiments and presently preferred methods of practicing the invention proceeds.

BRIEF DESCRIPTION OF THE DRAWINGS

The invention will become more readily apparent from the following description of preferred embodiments thereof shown, by way of example only, in the accompanying drawings wherein.

DETAILED DESCRIPTION OF THE INVENTION

Figure 1:
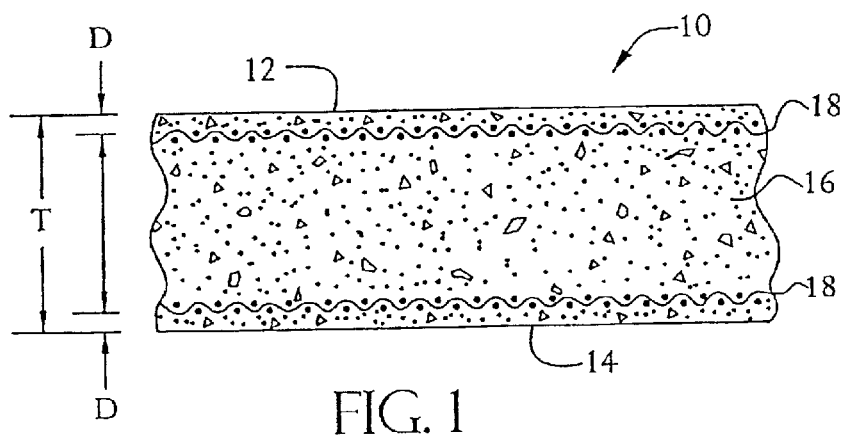
FIG. 1 is a cross-sectional view through the thickness of a cementitious board constructed in accordance with the present invention.

Referring initially to FIG. 1, there is shown a cementitious board or panel 10 constructed according to the present invention. Board 10 is substantially planar and has opposed faces 12 and 14 and thickness "T" typically of about ½ inch to about ⅝ inches although boards as thin as ¼ inch may be constructed for use primarily as floor tile backing or countertop tile backing. Board 10 may be manufactured to any peripheral or areal dimensions, e.g., the eight-foot length by four-foot width common to dry wall boards. At the job site board 10 may be cut by a power saw having a diamond-tipped or other suitably hardened blade to any desired size or shape.

Board 10 comprises cementitious matrix material 16 such as Portland cement concrete or other hydraulic cement which is reinforced near at least one or, more preferably, both of supposed faces 12 and 14 with reinforcement fabric 18 constructed in accordance with the present invention. It is especially advantageous to reinforce board 10 adjacent both of faces 12 and 14. In that way, should the board 10 be carried by workers in the generally horizontal disposition of FIG. 1, i.e., with the opposed board faces 12, 14 extending substantially parallel to the ground or floor surface, there will be high modulus tensile reinforcement in the cementitious matrix material 16 in the lower regions of the board 10 regardless of whether face 12 or face 14 is downwardly directed toward the ground or floor surface. Additionally, reinforcement disposed closed adjacent the faces of the board maximizes the flexural strength of the board when in service. To optimize the tensile reinforcement capabilities of fabric 18 and avoid spalling of the skin concrete adjacent faces 12 and 14, the central plane of fabric 18 should be embedded a depth "D" of about 1/32 to 1/16 inch from face(s) 12, 14.

In all embodiments of the present invention, reinforcement 18 may be a woven knit, nonwoven or laid scrim open mesh fabric having mesh openings of a size suitable to permit interfacing between the skin and core cementitious matrix material 16 of board 10. According to a presently preferred construction, reinforcement 18 can assume, for instance, a grid-like configuration having a strand count of between about 2 to about 18 strands per inch in each direction, preferably about 4 to about 12 strands per inch.

Figures 5, 6, 7:
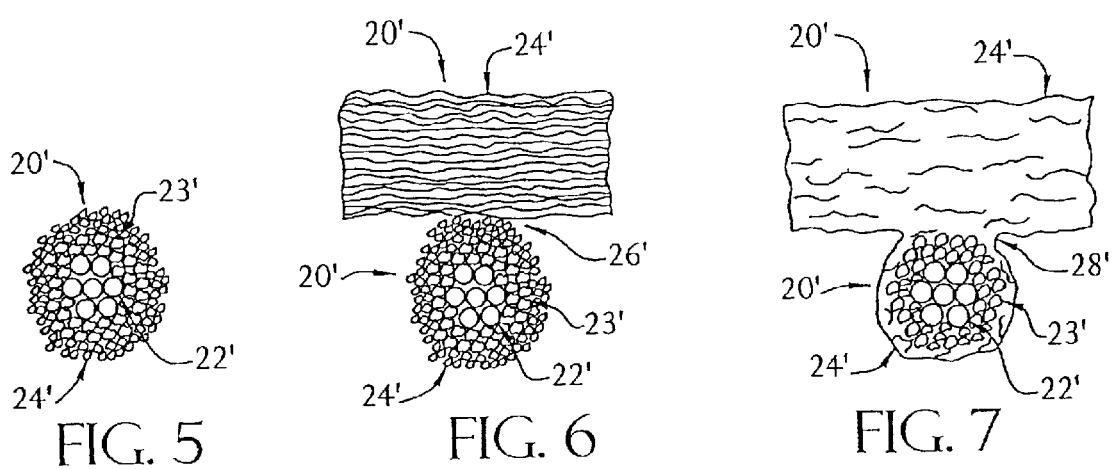
FIG. 5 is an end view of a second thermoplastic coated, high modulus fiber strand suitable for use in forming a further embodiment of an open mesh, cementitious board reinforcement fabric according to the present invention.
FIG. 6 is an elevation view of an area of intersection of a pair of thermoplastic coated high modulus strands constructed in accordance with FIG. 5 following formation thereof into an open mesh fabric.
FIG. 7 is a view similar to FIG. 6 showing the fusion of thermoplastic sheath material at areas of intersection of the strands of the open mesh following heating thereof to produce said further embodiment of cementitious board reinforcement fabric.

The mesh of reinforcement fabric 18 is preferably comprised of composite yarns or rovings 20 (FIGS. 2 through 4) or 20' (FIGS. 5 though 7). The composite threads or yarns 20, 20' comprise high modulus of elasticity core strands sheathed, at least in the final reinforcement fabric, in a continuous, i.e., imperforate, coating of water and alkali-resistant thermoplastic material.

Figures 2, 3, 4:
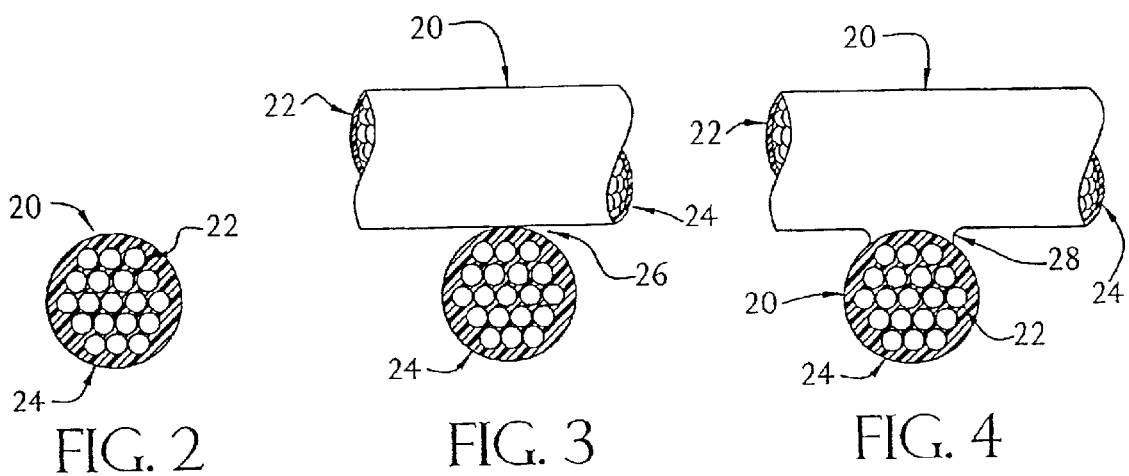
FIG. 2 is an end view of a first thermoplastic coated, high modulus fiber strand suitable for use in forming a first embodiment of an open mesh, cementitious board reinforcement fabric according to the present invention.
FIG. 3 is an elevation view of an area of intersection of a pair of thermoplastic coated high modulus strands constructed in accordance with FIG. 2 following formation thereof into an open mesh fabric.
FIG. 4 is a view similar to FIG. 3 showing the fusion of a thermoplastic sheath material at areas of intersection of the strands of the open mesh following heating thereof to produce said first embodiment of cementitious board reinforcement fabric.

As shown in FIGS. 2 through 4, yarn 20 includes a core strand 22 covered by a sheath 24. Core strand 22 preferably comprises a bundle of fibers having a Young's modulus of elasticity of at least about 1,000,000 psi such as polyamide fibers of poly(p-phenylene terephthalamide), known as KEVLAR®. More preferably, core strand 22 comprises a bundle of continuous filament "E" glass fibers having a linear density of about 33 to about 300 tex. Because of the presence of water and alkali in cementitious environments, "E" glass fibers or similar glass core strand materials, in the absence of sheath 24, would fail in weeks rather than the 20 to 40 year service life that is required for practical deployment of a cementitious board. Sheath 24 is a continuous coating of water and alkali-resistant thermoplastic material which may be co-extruded with core strand 22 in a manner similar to that described, for example, in U.S. Pat. No. 5,451,355, the disclosure of which is incorporated herein by reference. By co-extruding sheath 24 with core strand 22, the core strand continuously coats the core strand at the moment of manufacture of the yarn 20.

Preferred sheath materials for sheath 24 (or later-described sheath 24') include, without limitation, polypropylene and polyethylene, copolymers of polybutylene and propylene, ethylene propylene rubber (EPR), thermoplastic polyolefin rubber (TBR), polyvinylidene chloride (SARAN®) and ethylene-propylene diene monomer (EPDM). When constructed as a co-extruded yarn 20, such yarns may be woven, knitted or cross-laid by any known techniques to produce a desired open mesh having a plurality of yarn intersection areas 26 such as depicted in FIG. 3. Following formation of the desired mesh from yarn 20, the mesh is heated to a temperature to fuse thermoplastic sheaths 24 of intersecting yarns 20 at the intersection areas thereof, as represented by arrow 28 of FIG. 4, to affix and stabilize the yarns within the fabric. A reinforcement fabric constructed using yarn 20 is suitable for use in reinforcing cementitious boards such as board 10. However, co-extruded yarns constructed in the manner of yarn 20 are not particularly supple and thus do not possess the soft, flexible textile properties which are useful for converting yarns into broad varieties of fabrics.

Accordingly, an especially preferable yarn or roving 20' useful in the formation of mesh reinforcement fabric 18 us shown in FIGS. 5 through 7. Yarn or roving 20' includes a core strand 22' of high modulus fibers identical or similar to those of yarn 20. Unlike sheath 24 which provides a continuous, imperforate coating of core strand 22' at the moment of manufacture, sheath 24' is preferably constructed as a fibrous covering which is spun or otherwise wrapped about the core strand 22'. Suitable apparatus for fabricating yarn or roving 20' include the DREF-2 and DREF-3 friction spinning apparatus manufactured by Fehrer AG of Linz, Austria.

The DREF-3 apparatus is preferred, however, because the yarn 20' produced thereby comprises a fibrous core sliver 23' commingled with the core strand 22' and covered by sheath 24'. core sliver 23' may comprise any suitable thermoplastic material including, without limitation, either isotactic or syndiotactic polypropylene, ethylene-propylene copolymers or other olefinic fibers, nylon, polyvinyl chloride, or polyester, although polyolefins are preferred because of the physical durability and alkali resistance. Hence, because of its intimate contact with core strand 22', the core sliver 23' provides the core strand 22' with alkali resistance and ruggedness generally superior to core strands covered merely with sheath 24'. Sheath 24' is preferably fabricated from thermoplastic fibrous materials the same as or similar to core sliver 23'.

By virtue of its fibrous nature, sheath 24' is not entirely imperforate and thus possesses some pores which extend from the outer periphery of the yarn 20' to the core strand 22'. However, the composite yarn 20' is substantially more supple and flexible than yarn 20 and may be more readily woven, knitted or cross-laid into a desired open mesh fabric structure. The intersection 26' of the two yarns 20' of such a mesh fabric is shown is FIG. 6. Following formation of the fabric, the mesh is heated to a temperature sufficient to fuse or sinter, but not liquefy, the fibers of sheath 24' such that they merge into an agglomerated, continuous, imperforate mass encapsulating core strand 22' as depicted in FIG. 7. Concurrently, the rovings or yarns 20' become fused at their intersections as represented by arrow 28' of FIG. 7.

Although not illustrated, alternative reinforcement fabrics are contemplated to be within the scope of the present invention. For example, a suitable cementitious board reinforcement fabric 18 may incorporate desirable features of rovings or yarns 20 and 20'. More specifically, extrusion coated composite yarns 20 may provided in the warp or machine direction of the fabric and fiber covered composite yarns or rovings may be provided in the weft or cross-machine direction of the fabric, or vice versa. Thereafter, the "mixed" fabric may be heated after mesh formation to produce a reinforcement structure of continuously coated and united high modulus strands. According to all presently contemplated embodiments, the thickness of the reinforcement fabric 18, including at the intersections 26, 26' of yarns or rovings 20, 20' should not exceed 0.020 inch to avoid spalling of the skin layers of cementitious matrix material 16.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. A reinforcement for resisting flexure of a cementitious board having opposed faces, comprising: an open mesh of high modulus of elasticity strands, wherein the high modulus of elasticity strands comprise E-glass, and wherein the alkali resistant thermoplastic material comprises a core sliver of thermoplastic fibers commingled with the high modulus of elasticity strands, and a plurality of sheath thermoplastic fibers which cover the core sliver thermoplastic fibers and the high modulus of elastic strands; wherein the strands are covered by an alkali-resistant thermoplastic material adapting the open mesh for embedding in the cementitious board; the strands extending across one another to define a mesh thickness; wherein the open mesh is adapted with the mesh thickness for two embedded layers in the cementitious board; and wherein the open mesh is adapted with the mesh thickness for positioning each embedded layer about 1/32 inch to about 1/16 inch from a corresponding one of the opposed faces to avoid spalling, while each embedded layer is spaced from a neutral axis of flexure of the cementitious board to resist flexure of the cementitious board; wherein said alkali-resistant thermoplastic material is co-extruded with said strands to provide a substantially continuous coating of said alkali-resistant thermoplastic material about said strands; and wherein said alkali-resistant thermoplastic material is selected from the group consisting of polyolefins and olefin copolymers.

2. The reinforcement of claim 1 wherein said thermoplastic material is fused at areas where said strands cross one another.

3. The reinforcement of claim 1 wherein said mesh has a strand count of about 2 to about 18 strands per inch in each direction.

4. The reinforcement of claim 1 wherein said strands comprise bundled glass fibers having a linear density of about 33 to about 300 tex.

5. The reinforcement of claim 1 wherein said mesh is no greater than about 0.020 inch in mesh thickness.

6. The reinforcement of claim 1 wherein said reinforcement includes an open mesh of intersecting transverse and longitudinal high modulus of elasticity strands covered by alkali-resistant thermoplastic material, wherein said thermoplastic material initially is fibrous, and wherein at least a portion of the fibrous thermoplastic material is fused or sintered such that the portion of the fibrous thermoplastic material is merged into a substantially continuous mass which substantially encapsulates a respective high modulus of elasticity strands and which bonds together the transverse and longitudinal strands at areas of intersection, and wherein at least a portion of said thermoplastic material comprises one or more of polypropylene, polyethylene, copolymers of polybutylene and propylene, ethylene-propylene copolymers or other olefin, nylon, polyester, ethylene propylene rubber, thermoplastic polyolefin rubber, and ethylene-propylene diene monomer.

7. The reinforcement of claim 6 wherein said mesh is heated after formation thereof to fuse or sinter said portion of the fibrous thermoplastic material to form said substantially continuous mass.

8. The reinforcement of claim 6 wherein said fibrous thermoplastic material is friction spun as a fibrous sheath on a core comprised of said high modulus of elasticity strand.

9. The reinforcement of claim 1, wherein the core sliver of thermoplastic fibers comprises one or more of isotactic or syndiotactic polypropylene, ethylene-propylene copolymers or other olefinic fibers, nylon, polyvinyl chloride, or polyester, and wherein the sheath thermoplastic fibers comprise one or more of polypropylene, polyethylene, copolymers of polybutylene and propylene, ethylene propylene rubber, thermoplastic polyolefin rubber, and ethylene-propylene diene monomer.

10. The reinforcement of claim 1, wherein said alkali-resistant thermoplastic material is applied via cross head extrusion to said strands.

11. The reinforcement of claim 1 wherein said olefin copolymers include ethylene propylene rubber, thermoplastic polyolefin rubber, ethylene-propylene diene monomer or copolymers of polybutylene and propylene.

12. A reinforcement for resisting flexure of a cementitious board having opposed faces, comprising: an open mesh of high modulus of elasticity strands, respective coatings on the strands, wherein the respective coatings comprise an alkali-resistant material adapting the open mesh for embedding in the cementitious board and wherein the respective coatings comprise a fused or sintered core sliver of thermoplastic fibers commingled with the high modulus of elasticity strands, and a fused or sintered plurality of sheath thermoplastic fibers which cover the core sliver thermoplastic fibers and the high modulus of elasticity strands; and the strands extending across one another to define a mesh thickness.

13. The reinforcement of claim 12, wherein the respective coatings are fused together where the strands cross one another to stabilize the strands in the mesh.

14. The reinforcement of claim 12, wherein the respective coatings comprise fused or sintered fibrous alkali-resistant material, and wherein the respective coatings are fused together where the strands cross one another to stabilize the strands in the mesh.

15. The reinforcement of claim 12, wherein the core sliver of thermoplastic fibers comprises one or more of isotactic or syndiotactic polypropylene, ethylene-propylene copolymers or other olefinic fibers, nylon, polyvinyl chloride, or polyester, and wherein the sheath thermoplastic fibers comprise one or more of polypropylene, polyethylene, copolymers of polybutylene and propylene, ethylene propylene rubber, thermoplastic polyolefin rubber, and ethylene-propylene diene monomer.

16. The reinforcement of claim 12, wherein the strands comprise bundled fibers with a Young's modulus of at least 1,000,000 psi.

17. The reinforcement of claim 12, wherein said alkali-resistant material is co-extruded with the strands.

18. The reinforcement of claim 12, wherein said mesh has a strand count of about 2 to about 18 strands per inch in each direction.

19. The reinforcement of claim 12 wherein said strands comprise bundled glass fibers having a linear density of about 33 to about 300 tex.

20. The reinforcement of claim 12, wherein said mesh is no greater than about 0.020 inch in mesh thickness.

21. The reinforcement of claim 12, wherein said alkali-resistant material is selected from the group consisting of polyolefins and olefin copolymers.

22. The reinforcement of claim 12, wherein said respective coatings comprise one or more of polypropylene, polyethylene, copolymers of polybutylene and propylene, ethylene-propylene copolymers or other olefin, nylon, polyester, ethylene propylene rubber, thermoplastic polyolefin rubber, and ethylene-propylene diene monomer.

* * * * *